(12) United States Patent
Ruel

(10) Patent No.: US 7,032,926 B2
(45) Date of Patent: Apr. 25, 2006

(54) INFLATABLE SAFETY DEVICE

(75) Inventor: Laurent Ruel, Blainville (FR)

(73) Assignee: Forrester Ketley & Co., London (GB)

( * ) Notice: Subject to any disclaimer, the term of this patent is extended or adjusted under 35 U.S.C. 154(b) by 79 days.

(21) Appl. No.: 10/360,610

(22) Filed: Feb. 7, 2003

(65) Prior Publication Data

US 2003/0151234 A1 Aug. 14, 2003

(30) Foreign Application Priority Data

Feb. 12, 2002 (GB) .............................. 0203289

(51) Int. Cl.
*B60R 21/16* (2006.01)

(52) U.S. Cl. .................................. 280/743.1
(58) Field of Classification Search ............. 280/743.1, 280/739; 180/271
See application file for complete search history.

(56) References Cited

U.S. PATENT DOCUMENTS 6,752,454 B1 * 6/2004 Ruel et al. ............... 297/216.1

2005/0173899 A1 * 8/2005 Korechika ............... 280/730.1

FOREIGN PATENT DOCUMENTS

| GB | 2 339 738 | | 2/2000 |
| GB | 2 353 254 | | 2/2001 |
| GB | 2357466 A | * | 6/2001 |
| WO | WO-00/50270 | | 8/2000 |

* cited by examiner

*Primary Examiner*—Paul N. Dickson
*Assistant Examiner*—Joselynn Y. Sliteris
(74) *Attorney, Agent, or Firm*—Madson & Austin

(57) ABSTRACT

An inflatable safety arrangement for a safety device in a motor vehicle, especially an in-seat device to prevent "submarining" comprises an inflatable unit formed of at least one pre-formed plastically deformable element which initially defines an inwardly directed recess partially filling a void defined within the interior of the inflatable unit. On actuation of a gas generator the inwardly directed protrusion becomes an outwardly directed protrusion. The inwardly directed protrusion may have two substantially planar walls, one of which carries an outwardly extending projection.

7 Claims, 2 Drawing Sheets

INFLATABLE SAFETY DEVICE

BACKGROUND OF THE INVENTION

1. Field of the Invention

THE PRESENT INVENTION relates to an inflatable safety device, and more particularly relates to an inflatable safety device for use in a motor vehicle.

2. Description of Related Art

It has been proposed to use many different types of inflatable safety device in a motor vehicle, including air-bags formed from fabric. A typical fabric air-bag, when inflated, is substantially spherically shaped. If an occupant of the vehicle should strike an air-bag slightly "off-centre", there is a probability that the occupant will simply slide along the air-bag surface and strike a fixed object within, or forming part of, the motor vehicle cabin. Such problems may arise with front air-bags, and may also arise with side air-bags when the impact is from an oblique angle, relative to the axis of the vehicle, or if an air-bag is positioned at an off-set angle relevant to the occupant, such as a submarining-preventing air-bag mounted in a seat. It is to be noted that a typical seat structure does not allow an air-bag to be mounted so that the air-bag will inflate directly towards the pelvis area of the occupant of the seat.

Here reference is made to GB-A-2,357,466 which discloses a vehicle seat structure provided with an inflatable safety device, which includes an airbag made of metal. The safety device, prior to inflation thereof, is unobtrusive. However, when the safety device has been inflated, the safety device forms a raised barrier at the front part of the seat which minimises the risk of submarining.

SUMMARY OF THE INVENTION

The present invention seeks to provide an improved inflatable safety arrangement and, in particular, seeks to provide an improved inflatable safety arrangement for use in a vehicle seat.

According to this invention there is provided an inflatable safety arrangement comprising an inflatable unit formed of at least one preformed plastically deformable element which forms part of the periphery of a chamber adapted to be inflated, there being a gas generator to supply gas to the chamber, the said plastically deformable element initially spanning across a void and having an inwardly directed protrusion, the protrusion at least partially filling the void, the arrangement being such that on actuation of the gas generator the inwardly directed protrusion will become an outwardly directed protrusion.

Preferably the inwardly directed protrusion is provided with a projection, the arrangement being such that on actuation of the gas generator, the projection becomes an outwardly directed projection on the outwardly directed protrusion.

Conveniently at least part of the protrusion effects a rotational movement as it moves from the inwardly directed condition to the outwardly directed condition.

In one embodiment the plastically deformable element is formed of metal.

In an alternative embodiment the plastically deformable element is formed of plastic. The safety arrangement may be incorporated in a vehicle seat.

Conveniently the inflatable element is located within the squab of the seat towards the front edge of the seat.

BRIEF DESCRIPTION OF THE DRAWINGS

In order that the invention may be more readily understood, and so that further features thereof may be appreciated, the invention will now be described, by way of example, with reference to the accompanying drawings in which.

DETAILED DESCRIPTION OF THE INVENTION

Figure 1:
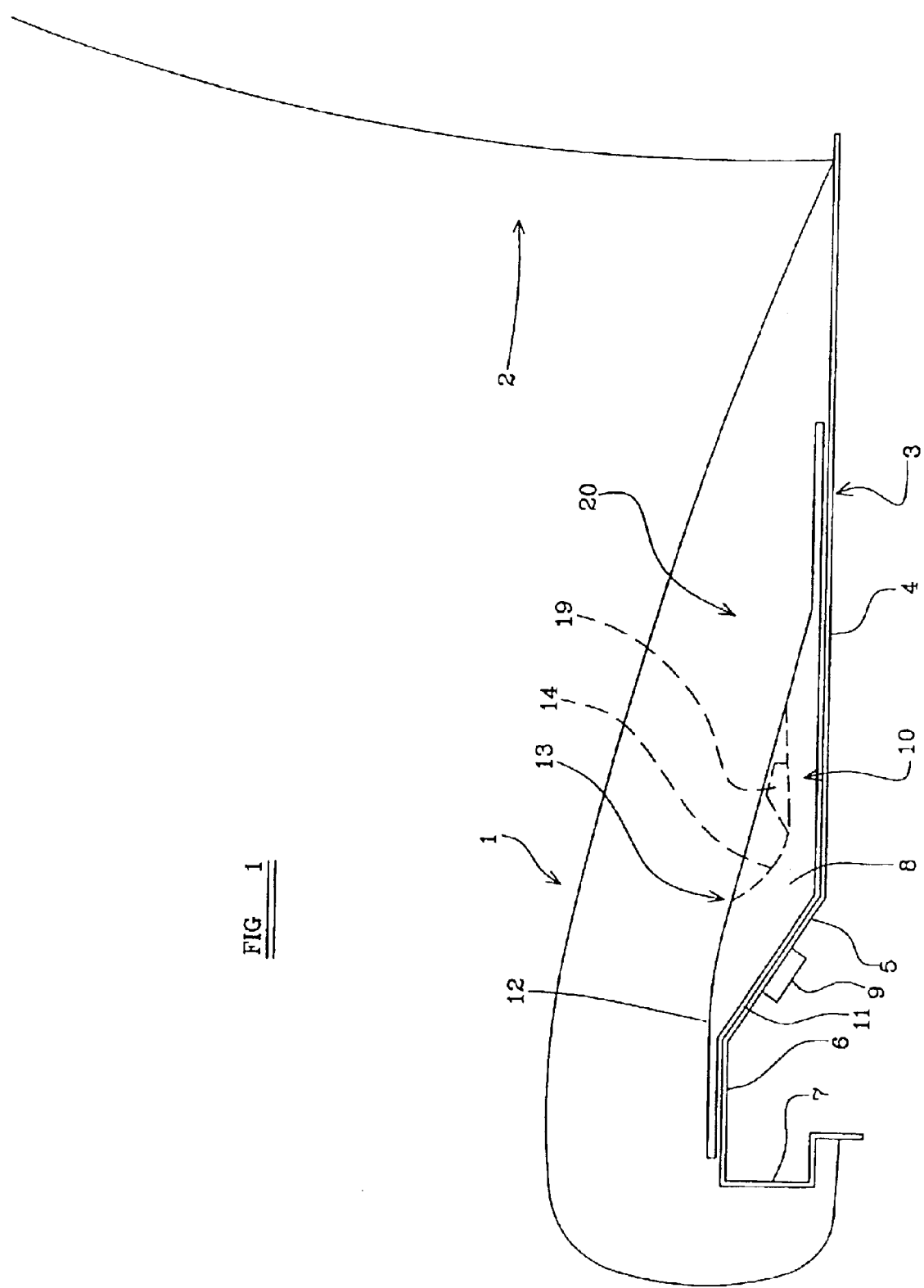
FIG. 1 is a sectional view through part of a vehicle seat incorporating an inflatable safety arrangement in accordance with the invention.

Referring initially to FIG. 1 of the accompanying drawings, part of a vehicle seat is illustrated. The seat comprises a squab unit 1, and a back unit 2.

The sub-structure of the squab unit is formed from a metal plate 3 which comprises a first generally planar region 4 located towards the rear of the seat, an upwardly and forwardly inclined region 5 extending therefrom, the inclined region 5 terminating with a further horizontal region 6 located towards the front of the seat. The forward edge of the horizontal region is provided with a depending substantially vertical extension 7 of the metal plate 3. The combination of the planar lower region 4 and the inclined region 5 define a substantially "V"-shaped void 8 defined between the sheets.

A gas generator 9 is provided which is secured to the inclined region 5 of the sheet 3. The gas generator 9 communicates with an inflatable air-bag 10. The inflatable air-bag 10, in the described embodiment, has a rearmost layer 11 which lies adjacent the metal sheet extending over part of the rearmost horizontal portion 4 of the sheet 3 of the inclined region 5, and the forward-most horizontal region 6.

The air-bag 10 also includes a front sheet or layer 12, at least part 13 of which is formed of a plastically deformable material, such as metal or plastic. The whole air-bag may be formed of metal or plastic layers, but in the described embodiment at least the part 13 of the layer 12 is a plastically deformable element.

Figure 2:
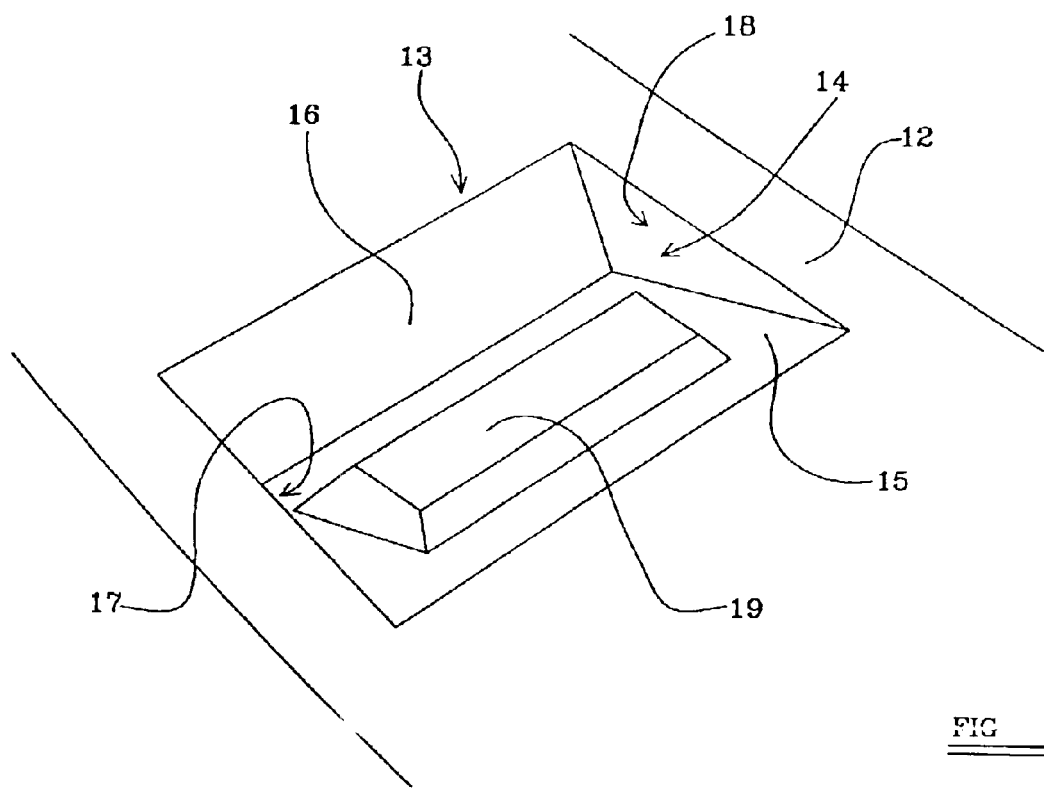
FIG. 2 is a perspective view of part of the seat shown in FIG. 1, with the padding and upholstery thereof removed for the sake of clarity of illustration.
Figure 3:
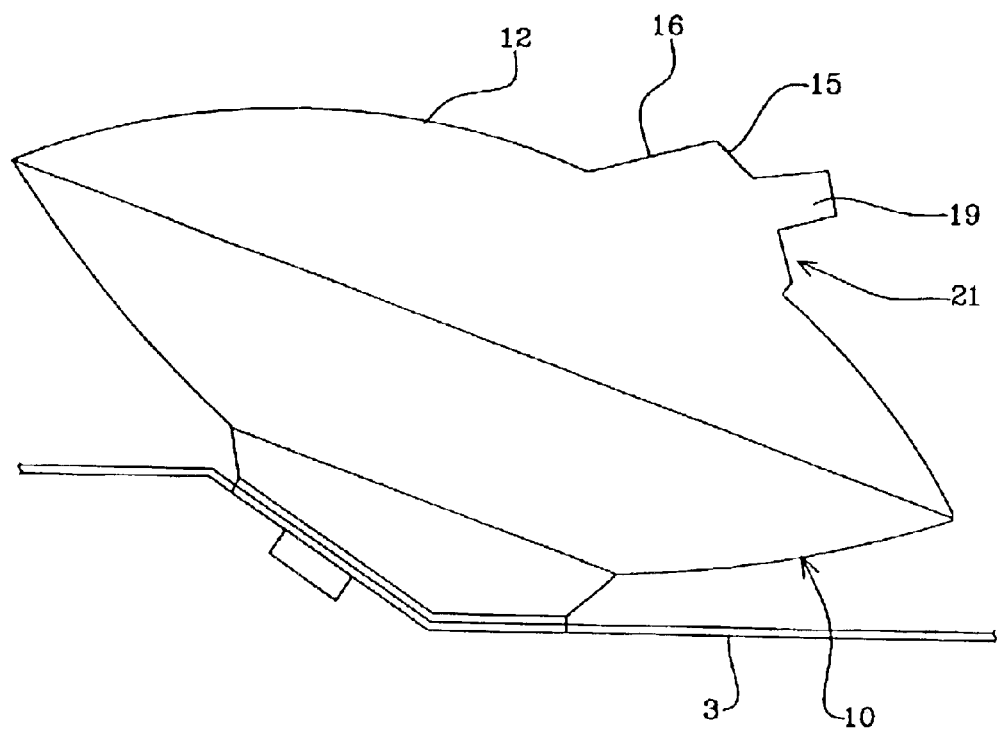
FIG. 3 is a view corresponding to part of FIG. 1 illustrating the safety arrangement following inflation thereof.

The front layer 12 again extends over part of the horizontal region 4 and part of the horizontal region 6, but spans across the void 8 defined by the horizontal region 4 and the inclined region 5. The part 13 of the upper-most layer 12 that is formed of plastically deformable material defines an inwardly directed protrusion 14 which extends into, and which at least partially fills, the void 8. The inwardly directed protrusion 14 is shown in perspective in FIG. 2. The inwardly directed protrusion has a lower wall 15 which is substantially horizontal, a rearward wall 16 which is substantially vertical, and two side walls 17/18 which are also substantially vertical. In this embodiment, the horizontal lower wall 15 has an upwardly directed projection 19 which is of elongate form and which extends transversely relative to the vehicle seat.

The entire inflatable safety arrangement is covered with foam padding 20 and upholstery, and thus the safety arrangement, in ordinary use of the vehicle seat, is not detectable.

Should an accident occur, the gas generator 9 will be actuated and gas will be injected into the interior of the air-bag 10. Thus gas will initially be injected into that part of the void 8 which is not filled by the inwardly directed protrusion 14. As gas is injected into the air-bag, the inwardly directed protrusion 14 becomes inverted or "pops-out" and, instead of protruding inwardly relative to the upper-most layer 12 of the air-bag, the protrusion extends outwardly. The protrusion now presents a generally outwardly directed upper wall 16, and a downwardly inclined front wall 15, the front wall 15 presenting an outwardly directed projection 19, thus defining a recessed area 21 located beneath the projection 19. It is to be understood that as the protrusion "pops-out", the lower wall 15 of the inwardly directed protrusion effectively rotates about its rear-most edge, so that the projection 19 follows an arcuate path.

The arrangement is such that the recessed area 21 may "catch" part of the occupant of the seat, as the occupant of the seat tends to move forwardly. The rotational movement of the projection 19 as it follows the arcuate path assists in the "catching" of part of the seat occupant with the inflatable safety arrangement thus effectively minimising the risk of "submarining".

Whilst, in the described embodiment, an air-bag is described as having two sheets or layers 11 and 12, it is to be appreciated that in a modified embodiment of the invention, a single sheet of deformable material may be secured to the underlying metal sheet 3 to form a volume that can be inflated.

The inwardly directed protrusion may have any convenient shape which may be symmetric, as illustrated, or asymmetric.

Whilst the invention has been described primarily with reference to a safety arrangement provided in a vehicle seat, the invention may find other applications, and thus the inflatable safety arrangement may be a side air-bag positioned in the door of a vehicle, a knee air-bag, a foot air-bag or, indeed, any other kind of air-bag that may have an off-set position relative to the occupant. In any of these locations, a rotational movement of part of the air-bag on inflation thereof may be of especial benefit.

In the present Specification "comprises" means "includes or consists of" and "comprising" means "including or consisting of".

What is claimed is:

1. An inflatable safety arrangement comprising an inflatable unit having a layer which forms part of the periphery of a chamber adapted to be inflated and which spans across a void, there being a gas generator to supply gas to the chamber, part of said layer being formed of at least one pre-formed plastically deformable element which initially spans across the void, the arrangement being charaterized in that the plastically deformable element has a protrusion directed inwardly relative to the layer, the protrusion at least partially filling the void, the arrangement being such that on actuation of the gas generator the inwardly directed protrusion will become an outwardly directed protrusion.

2. An arrangement according to claim 1 wherein the inwardly directed protrusion is provided with a projection, the arrangement being such that on actuation of the gas generator, the projection becomes an outwardly directed projection on the outwardly directed protrusion.

3. An arrangement according to claim 1 wherein at least part of the protrusion effects a rotational movement as it moves from an inwardly directed condition to an outwardly directed condition.

4. An arrangement according to claim 1 wherein the plastically deformable element is formed of metal.

5. An arrangement according to claim 1 wherein the plastically deformable element is formed of plastic.

6. An arrangement according to claim 1 further comprising a vehicle seat having a squab.

7. An arrangement according to claim 6 wherein the inflatable element is located within the squab of the seat towards the front edge of the seat.

* * * * *

UNITED STATES PATENT AND TRADEMARK OFFICE
CERTIFICATE OF CORRECTION

PATENT NO. : 7,032,926 B2
APPLICATION NO. : 10/360610
DATED : April 25, 2006
INVENTOR(S) : Laurent Ruel It is certified that error appears in the above-identified patent and that said Letters Patent is hereby corrected as shown below:

Title page, item (73) Assignee:
-Change the Assignee from "Forrester Ketley & Co., London (GB)" to --Autoliv Development AB, Vargarda, Sweden--

Signed and Sealed this

Twenty-fourth Day of April, 2007

JON W. DUDAS
*Director of the United States Patent and Trademark Office*